SYSTEM FOR SUPERIMPOSING INDIVIDUAL CHANNEL SPECTRA IN A NONINTERFERING MANNER

Filed April 10, 1967 3 Sheets-Sheet 1

INVENTOR
F. K. BECKER
BY J. P. Kearns
ATTORNEY

June 23, 1970 F. K. BECKER 3,517,131

SYSTEM FOR SUPERIMPOSING INDIVIDUAL CHANNEL SPECTRA IN A NONINTERFERING MANNER

Filed April 10, 1967 3 Sheets-Sheet 2

3,517,131

SYSTEM FOR SUPERIMPOSING INDIVIDUAL CHANNEL SPECTRA IN A NONINTERFERING MANNER

Floyd K. Becker, Colts Neck, N.J., assignor to Bell Telephone Laboratories, Incorporated, Murray Hill and Berkeley Heights, N.J., a corporation of New York Filed Apr. 10, 1967, Ser. No. 629,631
Int. Cl. H03j *1/12, 1/18*
U.S. Cl. 179—15 9 Claims

ABSTRACT OF THE DISCLOSURE

A data transmission system in which a plurality of data signals modulate a plurality of carrier waves so that the resultant modulated signals overlap in the frequency domain. These overlapping signals are added and transmitted with a pair of pilot tones. At the receiver, each channel is filtered, product demodulated, and sampled to recover the original data signals.

BACKGROUND OF THE INVENTION

Field of the invention

This invention relates to a data communications system and particularly to a data communications system in which a plurality of data signals may be frequency multiplexed for parallel transmission through a bandwidth-limited transmission medium.

Description of the prior art

Data signals generated in parallel, such as ones from telemetering equipment are often combined in a parallel-to-serial conversion multiplexer for transmission to a remote location. At the remote location, a receiver employs a serial-to-parallel conversion multiplexer to recover the parallel data signals. Use of time multiplexing techniques increase the cost of transmitting and receiving terminal equipment but results in a more efficient usage of available bandwidth. The reason present parallel transmission techniques result in inefficient utilization of bandwidth is that guard bands or channels are placed between adjacent signaling bands or channels to prevent interchannel interference. Even if sharp cutoff filters could be designed so that parallel signaling channels could be placed end to end without interchannel interference, the bandwidth consumed by each signaling channel would still exceed the Nyquist bandwidth of the signal transmitted.

Parallel transmission, however, does have one major advantage over serial transmission. A group of narrowband signals transmitted in parallel through a wideband dispersive transmission channel suffers less from the effects of delay distortion than does a wideband serial signal having the same information content. In order to attain full bandwidth utilization in a serial transmission system amplitude and delay equalization devices are often included in the receiver. Therefore, to aid in choosing between the use of a wideband serial transmission system or a narrowband parallel transmission system for data, one should compare the relative cost of terminal equipment with the cost of the bandwidth required of the channel.

Systems have been developed to increase bandwidth utilization efficiency in parallel transmission systems so that the advantages inherent in parallel transmission may be obtained without wasting valuable bandwidth. In one such system an in-phase carrier signal is modulated with a first information signal and a quadrature carrier signal is modulated with a second information signal. To separate the two information signals at the receiver, each modulated signal is filtered so that the interfering frequency components from the other modulated signal are symmetrical in the frequency domain with respect to the carrier frequency. The filtered signal is product demodulated to provide the unaltered information signal. Other systems have been developed for transmitting information signals in a plurality of overlapping signaling channels by employing quadrature carrier techniques. These systems require intricate correlation and storage devices to retrieve and extract independent signal information in the channels, and are therefore too costly to justify their use, notwithstanding the bandwidth savings.

BRIEF DESCRIPTION OF THE INVENTION

The present invention contemplates a multichannel parallel data communications system employing a plurality of carrier waves each modulated by an associated data signal. In the transmitter a first of the plurality of carrier waves is modulated by its associated data signal. A second of the plurality of carrier waves is modulated by its associated data signal. The second carrier wave has a frequency displaced from the first carrier wave by an amount equal to one-half the signaling rate of the first data signal and has a predetermined phase relationship thereto. The second data signal has the same data signaling rate as the first data signal and has a predetermined time relationship thereto. The two modulated carrier waves are combined with each other and may also be combined with the others of the plurality of modulated carrier signals to form a composite wave for transmission.

To recover the first data signal from the composite wave, a receiver may be employed in which the composite wave is filtered. The filter has a passband which includes all the frequencies in the composite signal associated with the first data signal. The filter is shaped so that the signals present in this passband which are associated with the second data signal are symmetrical in the frequency domain with respect to a frequency displaced from the first carrier frequency by the dotting frequency of the data signals. A carrier wave having a predetermined phase relationship to the symmetrical signals is employed in a demodulator to provide a demodulated baseband signal. The baseband signal is sampled once during each bit interval to provide the first data signal.

To recover the second data signal, the composite wave may be passed through a second filter which is separate but parallel to the first filter. The second filter has a passband which includes all the frequencies in the composite signal associated with the second data signal. The filter is shaped so that the signals present in this passband which are associated with the first data signal are symmetrical in the frequency domain with respect to the second carrier frequency. A carrier wave in quadrature with the symmetrical signals is employed in a demodulator. The demodulated signal is passed through a low pass filter and sampled to provide the second data signal.

If (1) the composite signal has been transmitted through a nondipersive transmission medium, (2) the timing of the first and second data signals is the same and (3) the carriers are in quadrature with their respective symmetrical signals, then both the first and second data signals can be recovered. If, however, the transmission medium is dispersive, the timing of the data signals and/or the phase relationships of the carrier waves and their symmetrical signals can be altered to provide the first and second data signals with a minimum of interchannel interference. The remaining of the plurality of data signals are recovered in the same manner as the first and second data signals.

DETAILED DESCRIPTION

Figure 4:
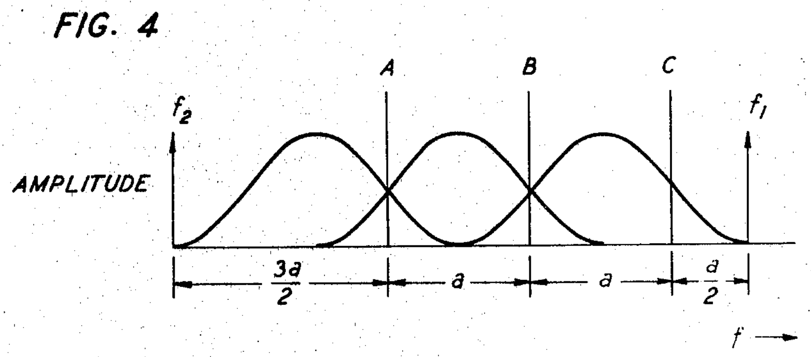
FIG. 4 depicts in graphical form the signal spectra provided by the transmitter shown in FIG. 2.

For an understanding of the novel data transmission methods taught by this invention, one can see in FIG. 4 three carrier frequencies designated A, B, and C each spaced from adjacent carriers by $a$. Each of the carriers A, B, and C has been modulated employing VSB techniques by a data signal having a signaling rate equal to twice the carrier spacing (i.e., $2a$). Therefore, the spectrum of each modulated signal resulting therefrom overlaps in the frequency domain.

Figure 5:
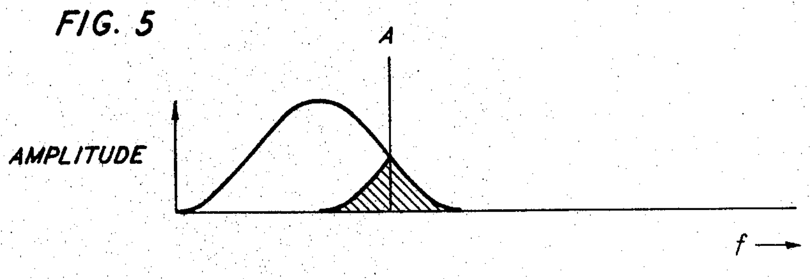
FIGS. 5, 6, and 7 each shows signals appearing in an individual channel of the receiver shown in FIG. 3.
Figure 6:
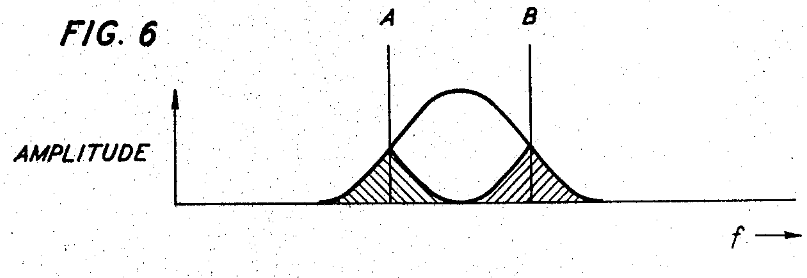
Figure 7:
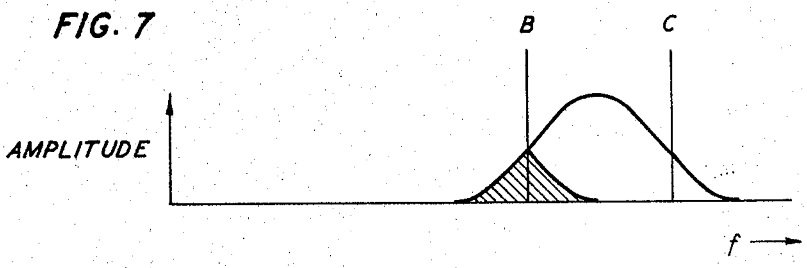

By filtering the composite signal shown in FIG. 4 with VSB filters identical to the filters used when modulating the carriers A, B, and C, one would obtain the signals shown in FIGS. 5, 6, and 7. The signal shown in FIG. 5 contains all the frequency components resulting from modulation of carrier A and some interfering frequency components resulting from the modulation of carrier B. The interfering frequencies, shaded in FIG. 5, may be made symmetrical in the frequency domain with respect to the carrier frequency A by proper shaping of the various VSB filters. If the interfering frequency components are not symmetrical, they would represent a signal in the time domain having frequency modulation. If they are symmetrical with respect to the carrier A and are product demodulated by using a demodulating carrier at carrier frequency A and in quadrature with the symmetrical frequency components, all the demodulation signals resulting therefrom will be at about twice the dotting frequency (i.e., $2a$) of the modulating data signal and therefore can be removed by low-pass filtering. If the same demodulating carrier in is phase with the signal resulting from the modulation of carrier A, this modulating data signal will result from the aforementioned product demodulation. Therefore, it is seen that in order to recover the data signal which modulated the carrier A, it is necessary that the interfering signals at the demodulator be in quadrature with the carrier used to product demodulate the received signal as shown in FIG. 5. It is clear that if the signals shown in FIG. 4 have been transmitted through a nondispersive transmission media, the criteria set forth above would be met by generating the carriers A and B so that the interfering frequencies would be in quadrature with the carrier A at the transmitter.

Looking now to FIG. 6, it is seen that after VSB filtering to obtain the modulation products associated with carrier B, there are two interfering frequency groups. One group is symmetrical with respect to the carrier B. This group results from the modulation of the carrier C as did the signals from modulation of the carrier B result in interference with the signal resulting from the modulation of carrier A. This interference can be dealt with by the techniques discussed with respect to recovering the data signal modulating carrier A. The group in FIG. 6 symmetrical with respect to the carrier A represents in the time domain a band-limited signal at the dotting frequency $a$ of the modulating data signals. If the data signals modulating carriers A and B have equal timing (i.e., phase) and the signal shown in FIG. 6 is product demodulated with a carrier equal in frequency to the carrier B and in quadrature with the interfering frequency group symmetrical with respect to the carrier A, then the demodulated signals resulting therefrom will pass through zero at the sampling instants of the data signal modulating carrier B. This will result in recovery of the data signal modulating carrier B without interference from the data signal modulating the carrier C or the data signal modulating the carrier A. It is clear that if the signals shown in FIG. 6 have been transmitted through a nondispersive transmission media, the criteria set forth above would be met by generating the carriers A, B, and C so that the interfering frequencies would all be in quadrature with the carrier B at the transmitter. It is also apparent that the signal shown in FIG. 7 can be demodulated employing the techniques discussed above with respect to the signal in FIG. 6 which is symmetrical with respect to the carrier A.

Figure 2:
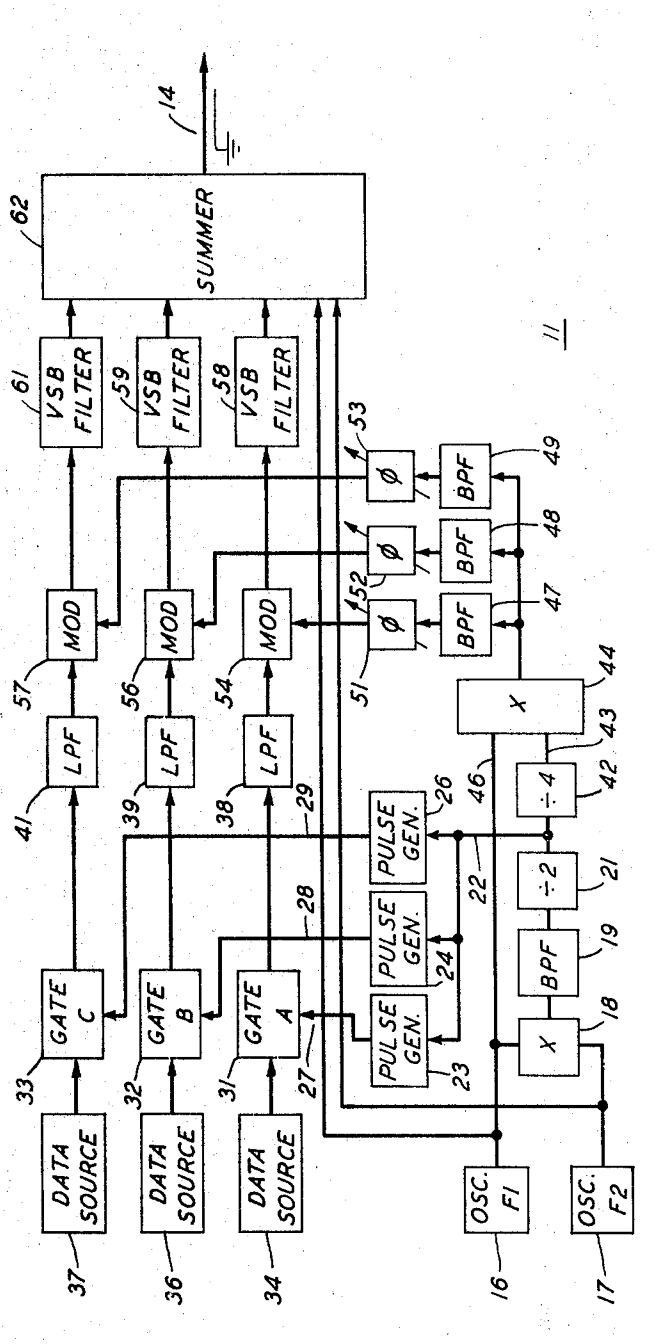
FIG. 2 shows a detailed block diagram of a multichannel data transmitting system employing the principles of this invention.
Figure 1:
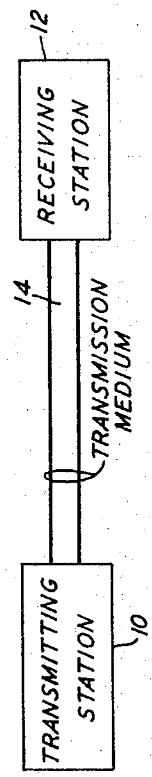
FIG. 1 provides a block diagram of a data communications system to which the principles of this invention may be applied.
Figure 3:
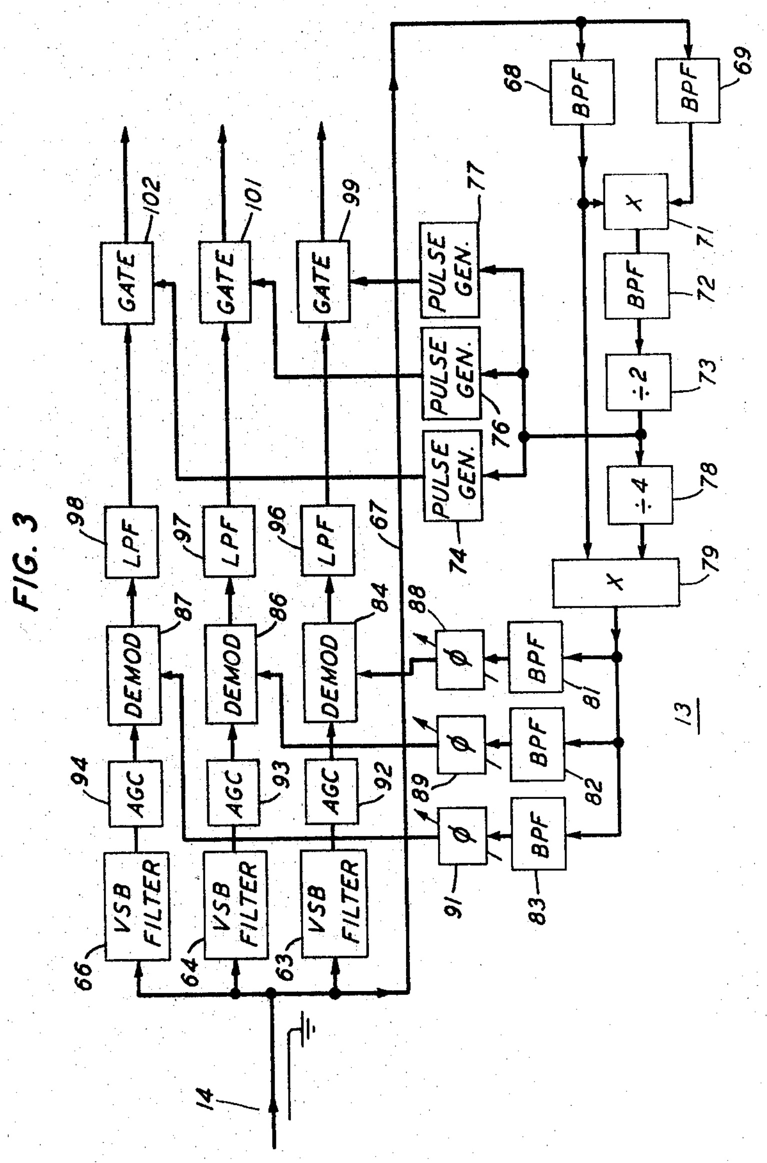
FIG. 3 shows a detailed block diagram of a multichannel data receiving system employing the principles of this invention.

Referring now to FIG. 1, there is seen a block diagram of a communications system to which the principles of this invention may be applied. A transmitting station 10 including a transmitter 11 (see FIG. 2) is connected to a receiivng station 12 including a receiver 13 (see FIG. 3) by a transmission medium 14. The transmitter 11 includes a pair of oscillators 16 and 17, the outputs of which are combined in mixer or multiplier 18. Oscillator 16 is tuned to an upper bandedge frequency F1, shown in FIG. 4, while oscillator 17 is tuned to a lower bandedge frequency F2 also shown in FIG. 4. The output of the mixer 18 is passed through a bandpass filter 19 tuned to the frequency difference between oscillators 16 and 17 (i.e., $4a$). The frequency difference provided by bandpass filter 19 is fed through divide-by-two circuit 21 which may comprise a conventional bistable flip-flop circuit to provide a square wave having a frequency equal to the data signaling rate or twice the dotting frequency (i.e., $2a$) of the data signals to be transmitted. The output of divide-by-two circuit 21 is fed over lead 22 to three pulse generators 23, 24, and 26 to provide gating signals on leads 27, 28, and 29. The pulse generators 23, 24, and 26 may each be variable delay pulse generators so that if transmission medium 14 is dispersive, the relative timing of the pulses appearing on lines 27, 28, and 29 may be adjusted to provide signals susceptible of noninterfering recovery at the receiver 13. The pulses on leads 27, 28, and 29 appropriately adjusted for equal timing or phase are applied to gates 31, 32, and 33, respectively, to apply data signals from data sources 34, 36, and 37, respectively, to low pass filters 38, 39, and 41, respectively. The low pass filters 38, 39, and 41 serve to bandlimit the data signals applied from the data sources 34, 36, and 37 to prevent a well known form of nonlinear distortion sometimes referred to as "foldover" distortion.

The output of the frequency divider 21 is also applied to a scale-of-four circuit 42 which may include a pair of flip flops to provide a signal on the lead 43 to mixer or multiplier 44. The signal on lead 43 is an harmonic-rich square wave with a fundamental at one-half the dotting frequency of the data signals (i.e., $a/2$). The output from the oscillator 16 is applied by lead 46 to the mixer 44. The output of the mixer 44 is passed through bandpass filters 47, 48, and 49 to provide carriers A, B, and C, respectively (see FIG. 4), by filtering out the difference frequencies between the output of oscillator 16 (i.e., F1 which is equal to $5a$), and the fifth harmonic of $a/2$. It is seen that in this way, carriers of different frequencies can be generated having predetermined phase relationships. The three carriers are passed through variable phase shifters 51, 52, and 53 so that the proper quadrature relationships between the various signals can be achieved in practical embodiments. The outputs from the variable phase shifters 51, 52, and 53 are modulated by the data signals from the output of low pass filters 38, 39, and 41 in modulators 54, 56, and 57, respectively. The modulated data signals are applied to VSB filters 58, 59, and 61 to provide proper VSB spectral shaping.

The shaped outputs of the VSB filters 58, 59, and 61 are added to each other and to pilot tones from oscillators 16 and 17 in a summer 62 to provide the signal shown in FIG. 4. The output of summer 62 is applied to transmission medium 14.

To recover the data signals applied by gates 31, 32, and 33, respectively, to low pass filters 38, 39, and 41, respectively, at the receiving station 12, VSB filters 63, 64, and 66 having bandpass characteristics similar to the characteristics of VSB filters 58, 59, and 61, respectively, are employed. The output of VSB filters 63, 64, and 66 are shown in FIGS. 5, 6, and 7, respectively. The signal received on transmission medium 14 is also applied by a lead 67 to a pair of bandpass filters 68 and 69 to filter out the pilot tones from the oscillators 16 and 17. The output from bandpass filters 68 and 69 are mixed in mixer or multiplier 71 and the difference frequency $4a$ is obtained from bandpass filter 72. A divide-by-two circuit 73 applies a signal having a frequency equal to the data signal rate $2a$ to pulse generators 74, 76, and 77, respectively. The output of divide-by-two circuit is also applied to a scale-of-four circuit 78 whose output at the frequency $a/2$ is mixed with the output at the frequency $5a$ from bandpass filter 68 in mixer or multiplier 79. The output from mixer 79 is passed through filters 81, 82, and 83, respectively, to provide demodulating carriers at frequencies A, B, and C, respectively, to product demodulators 84, 86, and 87 through variable phase shifters 88, 89, and 91. As is apparent from the foregoing discussion of the signaling method described, phase shifters 88, 89, and 91 may be used to minimize interchannel interference if transmission medium 14 is dispersive. These signals, shown in FIGS. 5, 6, and 7 are applied from VSB filters 63, 64, and 66 to AGC circuits 92, 93, and 94, respectively. The AGC circuits are employed to piecewise linearly equalize amplitude versus frequency nonlinearities in the transmission medium 14. The outputs of AGC circuits 92, 93, and 94 are product demodulated in demodulators 84, 86, and 87, whose outputs are applied to low pass filters 96, 97, and 98 to remove double frequency components present therein. The outputs of the low pass filters 96, 97, and 98 are sampled by gates 99, 101, and 102 under control of the variable pulse generators 77, 76, and 74, respectively, to provide the data signals transmitted. Pulse generators 77, 76, and 74 may have their relative timing varied to help compensate for delay distortion if transmission medium 14 is dispersive.

The above-described frequency multiplexing techniques may be employed to conserve bandwidth in parallel transmission systems employed for the purposes of amplitude and delay equalization. It is known that for these purposes, the larger number of channels and therefore the narrower bandwidth channels employed will result in more optimum amplitude and delay equalization. The above description employed three channels as an illustrative embodiment because all the principles and structures required for a broad understanding of a multichannel system may be obtained therefrom. The signals seen in FIG. 5 and FIG. 7 would be seen in the highest and lowest frequency channel in a multichannel system employing the principles of this invention. All intermediate channels, whatever number may be employed, would vary after filtering, as does the signal in FIG. 6.

While the above-described embodiment employs alternate carriers in quadrature modulated by data signals having equal timing, it should be understood that, since the phasing of the carrier and the timing of the carrier signal interact to effect the relative phase of the two interfering signals in overlapping channels, various combinations of relative carrier phasing and data signal timing can be employed to provide data transmission by vestigial sideband techniques through overlapping channels in a noninterfering manner.

It is to be understood that the above-described arrangement is simply illustrative of the application of the principles of this invention. Numerous other arrangements employing the principles of this invention will be readily apparent to those skilled in the art.

What is claimed is:

1. In combination:

means for generating a first carrier wave at a first frequency;

means responsive to a first data signal having a data signaling rate for modulating said first carrier wave to provide a first modulated signal having frequency components therein differing from said first frequency by a first value which is more than one-half said data signaling rate;

means for generating a second carrier wave at a second frequency displaced from said first frequency by one-half said data signaling rate, and having a predetermined phase relationship thereto;

means responsive to a second data signal having the same data signal rate as said first data signal and a predetermined time relationship thereto for modulating said second carrier wave to provide a second modulated signal having frequency components therein differing from said second frequency by said first value; and means for combining said first and second modulated signals to provide a composite signal.

2. The combination as defined in claim 1 including:

means for generating said first data signal; and means for generating said second data signal.

3. The combination as defined in claim 1 in which said first and second modulated signals are symmetrical in the frequency domain.

4. The combination as defined in claim 3 also including:

first means for filtering said composite signal to provide said second modulated signal and an interfering signal symmetrical in the frequency domain with respect to a frequency displaced from said second frequency by one-half said data signaling rate.

5. The combination as defined in claim 4 also including:

second means for filtering said composite signal to provide said first modulated signal and an interfering signal symmetrical in the frequency domain with respect to said first frequency.

6. A method of signaling including the steps of:

generating a first carrier wave at a first frequency;

modulating said first carrier wave with a first data signal having a data signaling rate to provide a first modulated signal having frequency components therein differing from said first frequency by a first value which is more than one-half said data signaling rate;

generating a second carrier wave at a second frequency displaced from said first frequency by one-half said data signaling rate, and having a predetermined phase relationship thereto;

modulating said second carrier wave with a second data signal having the same data signaling rate as said first data signal and a predetermined time relationship thereto to provide a second modulated signal having frequency components therein differing from said second frequency by said first value; and combining said first and second modulated signals.

7. In a transmitter for sending signals in parallel frequency overlapping channels along a phase distorting transmission medium to be recovered in a noninterfering manner at a receiver;

means for generating a first carrier signal having a first frequency and a predetermined phase at said receiver;

means for generating first and second data signals having the same signaling rate and time relationship;

means responsive to said first data signal for modulating said first carrier wave to provide a first modulated signal having frequency components therein differing from said first frequency by a first value which is more than one-half said data signaling rate;

means for generating a second carrier wave at a second frequency displaced from said first frequency by one-half said data signaling rate and in quadrature with said first carrier wave at said receiver; and means responsive to said second data signal for modulating said second carrier wave to provide a second modulated signal having frequency components therein differing from said second frequency by more than one-half said data signaling rate.

8. In combination:

means for generating a first carrier wave at a first frequency;

means responsive to a first signal having a data signaling rate for modulating said first carrier wave to provide a first modulated signal having frequency components therein differing from said first frequency by a first value which is more than one-half said data signaling rate;

means for generating a second carrier wave at a second frequency displaced from said first frequency and having a predetermined phase relationship thereto;

means responsive to a second data signal having the same data signaling rate as said first data signal and a predetermined time relationship thereto for modulating said second carrier wave to provide a second modulated signal;

means for combining said first and second modulated signals; and means for filtering said composite signal to provide said first modulated signal and an interfering signal symmetrical in the frequency domain with respect to a frequency displaced from said first frequency by one-half said data signaling rate.

9. The combination as defined in claim 8 wherein said second modulated signal has frequency components therein differing from said second frequency by said first value; said combination also including:

second means for filtering said composite signal to provide said second modulated signal and an interfering signal symmetrical in the frequency domain with respect to said second frequency.

References Cited

UNITED STATES PATENTS

| | | | |
|---|---|---|---|
| 3,163,718 | 12/1964 | Deman | 179—15 |
| 2,905,812 | 9/1959 | Doelz et al. | 343—203 |
| 3,349,182 | 10/1967 | Ito et al. | 178—67 |
| 3,430,143 | 2/1969 | Walker et al. | 178—67 |
| 2,188,499 | 1/1940 | Curtis | 179—15 |
| 2,565,409 | 8/1951 | Thompson | 179—15 |
| 2,617,036 | 11/1952 | Hansen et al. | 331—37 |
| 2,776,373 | 1/1957 | Mischler | 331—37 |
| 2,934,716 | 4/1960 | Smith | 331—39 |
| 3,290,440 | 12/1966 | Easton et al. | 178—67 |
| 3,364,311 | 1/1968 | Webb | 179—15 |
| 3,379,992 | 4/1968 | Hoo | 331—38 |

OTHER REFERENCES

R. W. Chang, Synthesis of Band-Limited Orthogonal Signals for Multichannel Data Transmission, Bell Systems Technical Journal, vol. 45, December 1966, pp. 1775–1796.

KATHLEEN H. CLAFFY, Primary Examiner

A. B. KIMBALL, Jr., Assistant Examiner

U.S. Cl. X.R.

325—40, 42, 50